March 20, 1951 M. D. ERCOLINO Re. 23,346

HIGH-FREQUENCY ANTENNA

Original Filed Dec. 27, 1948 2 Sheets-Sheet 1

INVENTOR.
MICHAEL D. ERCOLINO
BY S. Stephen Baker
ATTORNEY

March 20, 1951 M. D. ERCOLINO Re. 23,346

HIGH-FREQUENCY ANTENNA

Original Filed Dec. 27, 1948 2 Sheets-Sheet 2

INVENTOR.
MICHAEL D. ERCOLINO
BY
D. Stephen Baker
ATTORNEY

Reissued Mar. 20, 1951

Re. 23,346

UNITED STATES PATENT OFFICE 23,346

HIGH-FREQUENCY ANTENNA

Michael D. Ercolino, Wanamassa, N. J., assignor to Telrex, Inc., Asbury Park, N. J.

Original No. 2,518,297, dated August 8, 1950, Serial No. 67,360, December 27, 1948. Application for reissue September 6, 1950, Serial No. 183,456

7 Claims. (Cl. 250—33.65)

Matter enclosed in heavy brackets [ ] appears in the original patent but forms no part of this reissue specification; matter printed in italics indicates the additions made by reissue.

This invention relates to high frequency antennas and more particularly to antennas generally employed for television, frequency modulation and other high frequency systems.

The efficiency of a conventional dipole antenna is well understood as is its action at frequencies other than for which it is designed. Briefly, a dipole designed for one frequency will operate at reduced efficiency when operated at differing frequencies. In the event of higher frequencies, the effect is due to flattening out of the radiation lobes so that although more wire or metal is being energized, the effective radiation of the antenna in any one direction is less.

The present invention provides a dipole antenna wherein a pair of dipole rods are tilted forward so that flattening of the lobes is prevented. Substantially all the energy becomes additive and in phase, the lobe sharpening and remaining in line for a considerable frequency range. The antenna is cut to the lowest frequency of a wide range of frequencies to be accommodated. At higher frequencies it becomes continuously more effective than a half wave until, at the highest channel frequency to be received, it may function as a full wave antenna on each dipole rod with practically the same pattern as at its lower frequencies. Accordingly, the voltage derived at such higher frequencies is more effective. The antenna, with its dipoles tilted forward, is particularly efficient when in the form of crossed dipoles which simulate the action of solidly spun cones without involving the bulk of such cones. It will be recognized that the effect thereof is to render the center impedance substantially constant.

In providing the antenna of the instant invention, I have further devised a bracket system which extremely facilitates the assembly and installation of the antenna with the dipoles properly positioned and automatically given the required forward lean or tilt.

The above and other advantages and objects of my invention will be further understood from the following description and drawings in which.

The invention is illustrated in connection with a crossed dipole front element and a similar reflector element spaced to the desired degree. However, the invention is applicable to other forms of dipole arrangements, such as folded or single dipoles or the like.

Figure 4:
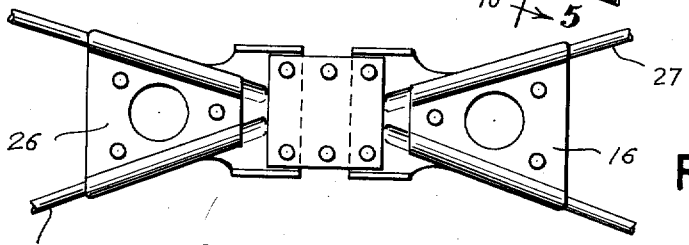
Fig. 4 is a rear view of Fig. 3.
Figure 5:
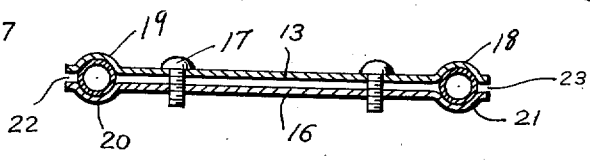
Fig. 5 is an enlarged cross-sectional view along the line 5—5 of Fig. 3.

In the form shown, the antenna comprises a cross beam 10 to which is connected an end member 11 supporting an insulation block 12. It is on this insulation block that the dipoles are effectively mounted although it is evident that any conventional arrangement may be employed in place of that described. Outer bracket member 13 is secured by bolts or screws 14 to block 12. Bracket member 13 is bent along a line 15 so that it is caused to be forwardly tilted in relation to beam 10. Inner bracket member 16 extends from just past the bend line 15 to the end of bracket member 13. Thus, bracket member 16, in the form shown, is a metal piece of substantially triangular shape being complementary in form to the somewhat triangular outer portion of bracket member 13, as illustrated in Fig. 4. Members 13 and 16 are maintained connected by bolts 17 which, when the dipoles are not applied, generally maintain a suitably spaced relationship between the bracket members.

Bracket member 13 is shown as substantially triangular, the edges thereof defining an angle of approximately 45 degrees. The outer margins or legs 18 and 19 of the triangle are shaped so as to be concavo-convex. The margins or legs 20 and 21 of member 16 are similarly formed so that, complementing the shape of margins 18 and 19, a pair of angularly related channels 22 and 23 are formed when the bracket members are engaged. To the other side of insulation block 12 are connected the brackets 25 and 26 which duplicate, in form and function, the bracket previously described.

In the formed margin channels of each bracket are inserted and maintained the front dipole rods 27 which automatically assume the proper cross-angle and tilt as provided by the bending of the top bracket members as well as by the channels 22 and 23 formed by the engaged members.

In the form shown, the antenna is provided with a straight reflector system spaced from the front dipoles by the length of beam 10. Thus, end member 30 supports the outer one-piece bracket member 31 which has angular extremities duplicating those illustrated in Fig. 3 but being integral instead of being separated by insulation. Two inner bracket members 32 and 33 are connected as by bolts 34 to the respective angular extremities of reflector bracket 31. The angularly set channels 35 and 36 at one end of the reflector bracket provide positioning means for dipole rods 37, while the other end of the reflector bracket does the same for the opposite dipole rods.

In order to mount the antenna described to a mast, any conventional means may be employed. Thus, a U-shaped clamp 40 has its legs brought through beam 10 and fastened as by nuts 41. An opposing clamp member 42 clamps, in combination with U-shaped clamp 40, the mast 43 when the nuts 41 are tightened. Such an arrangement is, of course, more or less conventional and may be supplanted by various other mast arranging means.

The assembly and installation of the antenna described is rendered most convenient and simple through the bracket construction set forth. Thus, rods 27 which may, if desired, be in the form of aluminum tubing or the like, are simply inserted in the channels 22 and 23 whereupon the bolts 17 are tightened so as to reduce the size of the channel and firmly grip the rods. In this way, the V-shaped disposition of the rods is automatically achieved and maintained. Further, and as is considered of importance, they are automatically given the desired forward tilt by virtue of the pre-formed bend 15. The front dipole rods having been inserted and clamped, those of the rear or reflector portion may be similarly applied. All of the dipole rods may be of the same form so as to economize on manufacturing expenses and facilitate site assembly of the antenna.

Figure 6:
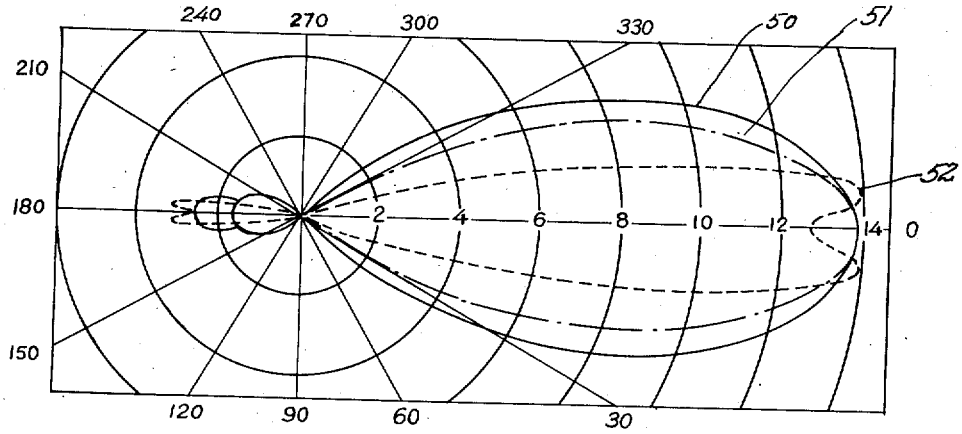
Fig. 6 is a graphical view illustrating the lobe patterns obtained by an antenna of my design at widely varying frequencies.

In the form shown, the desired forward tilt is effected by the angular relationship of the elongated dipole rods 27, the angle of which may be in the order of 140 degrees or the like although considerable deviation from such angle is permissible without deviating from the advantages of the invention. Referring to Fig. 6, there are shown lobe patterns obtained over a band of frequencies when employing an antenna constructed according to the instant invention. The solid line pattern 50 shows the response of the antenna at 60 megacycles. The broken line pattern 51 shows a response at 175 megacycles while the small dash line pattern 52 shows the response at 215 megacycles. The antenna was cut as a dipole at the 60 megacycle frequency. It will be observed that all the lobes are in substantial alignment and that the front to back ratio is extremely favorable.

Figure 1:
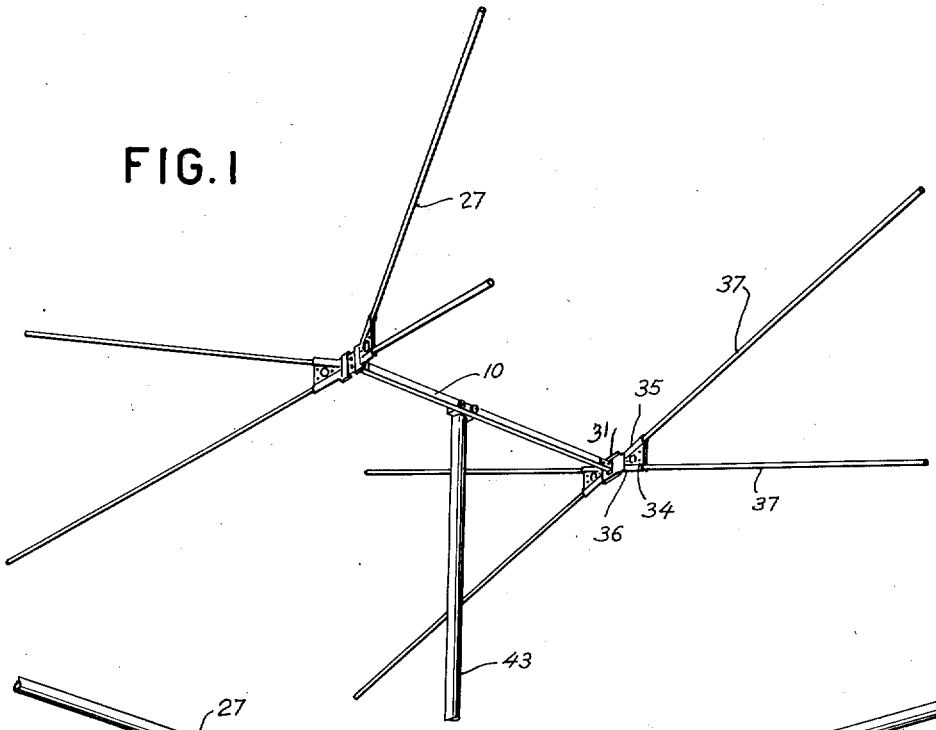
Fig. 1 is a perspective view of one form of the improved antenna as installed for operation.
Figure 2:
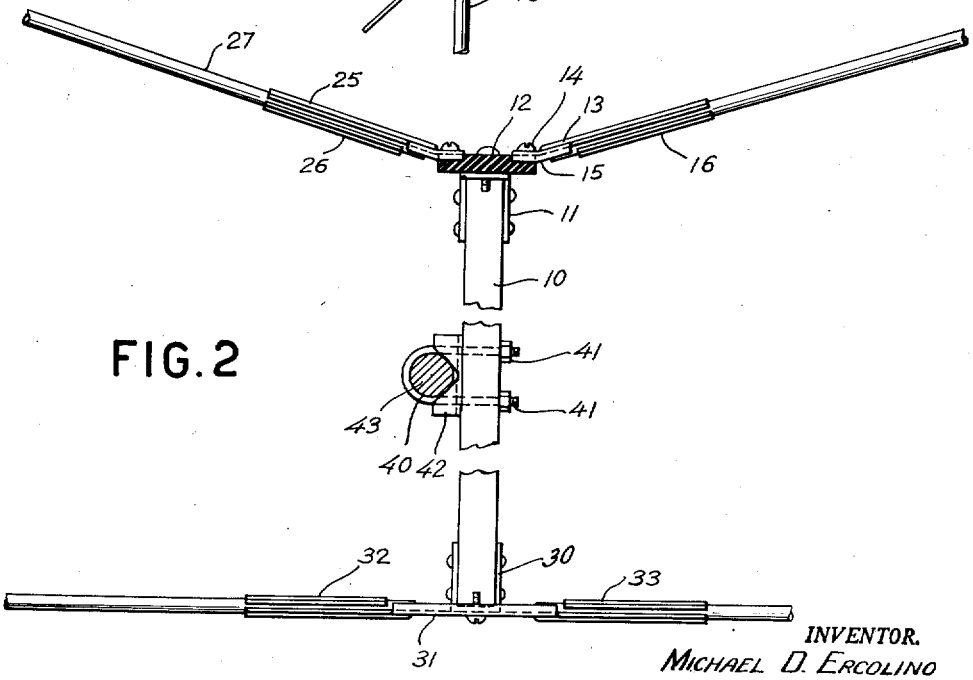
Fig. 2 is a partly broken away top view thereof.
Figure 3:
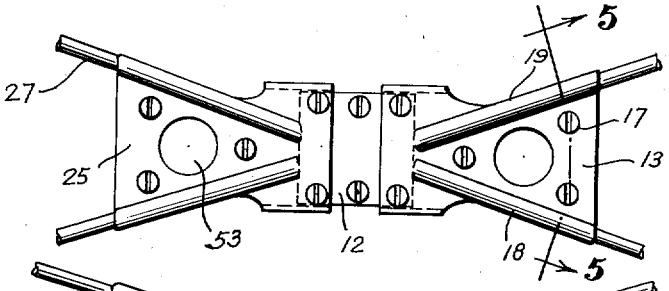
Fig. 3 is a fragmentary, enlarged view of the bent bracket resulting in the tilted dipole arrangement.

When a single dipole is used, the axis of elongation of the rods will be in the same horizontal plane. When the crossed or V dipole arrangement is used, as illustrated in Figs. 3 and 4, the apices of each V formed by the dipoles of each bracket will be substantially adjacent the V dipole structure of the opposite bracket. Further, as shown, the axis of each V structure will be in substantially the same horizontal plane.

The brackets are shown as being formed with central openings 53. These are considered of value in that the antenna offers less wind resistance when secured to a mast so that the stability of the structure is enhanced.

The length of beam 10 is such as to maintain approximately one-quarter wave lengths spacing between the front dipole structures and the reflectors as is well known in the art. However, the antenna is used for broad band reception.

Accordingly, the distance between the front dipoles and the reflectors effectively varies with frequency by virtue of the straight disposition of the reflector dipole structures.

*It will be noted that the front dipole structure comprises complementary or opposite dipole elements and that they are arranged in a geometrical configuration having a horizontal axis of symmetry. The rear dipole structure likewise comprises complementary dipole elements and has a horizontal axis of symmetry which is in the same horizontal plane as the horizontal axis of the front dipole structure. Although the front dipole elements are forwardly inclined and define an obtuse angle between them, the rear elements lie in a substantially vertical plane.*

While there has been shown what at present is considered a preferred embodiment of the invention, it will be evident that many changes and modifications may be made therein without departing from its spirit. It is therefore aimed in the appended claims to cover all such changes and modifications which fall within the true spirit and scope of the invention.

What is claimed is:

1. A high frequency antenna comprising front and rear V-shaped antenna elements, said front antenna elements consisting solely of a single pair of front V-shaped dipole structures, each dipole structure having its axis in a horizontal plane and the apices of the respective structures being substantially adjacent each other, an insulating member between said apices and to which the structures are connected, each of said front pair of V-shaped structures being inclined toward the other so that their axes form an obtuse angle, said rear V-shaped antenna elements consisting solely of a single rear pair of V-shaped dipole structures spaced from said front pair of dipole structures so as to act as reflectors therefor, the axes of said rear pair of V-shaped dipole structures being in a horizontal plane and in substantial alignment, the obtuse angle formed by said front pair of V-shaped structures axes, having its apex directed toward, and its arms directed away from, said rear pair of V-shaped structures.

2. A high frequency antenna according to claim 1 and including a pair of brackets fastened to said insulating member and to the respective front dipole structures, each of said brackets being bent along a vertical line so that said front dipole structures are maintained inclined toward each other by the bend in the brackets.

3. A high frequency antenna comprising front and rear V-shaped antenna elements, said front V-shaped antenna elements being composed of a single pair of crossed dipoles so as to form two front V-shaped dipole structures, each dipole structure having its axis in a horizontal plane and the apices of the respective structures being adjacent each other, each of said front pair of V-shaped structures being inclined toward the other so that their axes form an obtuse angle, said rear V-shaped antenna elements being composed of a second pair of crossed dipoles so as to form two rear V-shaped dipole structures spaced from said front pair of dipole structures so as to act as reflectors therefor, the axes of said rear pair of V-shaped dipole structures being in a horizontal plane and in substantial alignment, the obtuse angle formed by said front pair of V-shaped structures axes, having its apex directed toward, and its arms directed away from, said rear pair of V-shaped structures.

*4. A high frequency antenna comprising front and rear antenna elements, said front antenna element being composed of a single pair of crossed dipoles so as to form two front V-shaped dipole structures, each dipole structure having its axis in a horizontal plane and the apices of the respective structures being adjacent each other, each of said front pair of V-shaped structures being inclined toward the other so that their axes form an obtuse angle, said rear antenna element being composed of at least two aligned dipole arms constituting a dipole, said rear antenna element having its axis substantially straight and in a horizontal plane, said rear antenna element being spaced from said front pair of dipole structures so as to act as a reflector therefor, the obtuse angle formed by said front pair of V-shaped structures axes, having its apex directed toward and its arms directed away from, said rear antenna element axis.*

*5. A high frequency antenna comprising front and rear antenna elements, said front antenna element being composed of a single pair of crossed dipoles so as to form two front V-shaped dipole structures, each dipole structure having its axis in a horizontal plane, each of said front pair of V-shaped structures being inclined toward the other so that their axes form an obtuse angle, said rear antenna element being composed of at least two aligned dipole arms constituting a dipole, said rear antenna element having its axis substantially straight and in a horizontal plane, said rear antenna element dipole being spaced from said front pair of dipole structures so as to act as a reflector therefor, the obtuse angle formed by said front pair of V-shaped structures axes, having its apex directed toward and its arms directed away from, said rear antenna element axis.*

*6. An antenna comprising a front member and a rear member, said rear member being horizontally spaced from said front member so as to act as a reflector therefor, said front member being composed of forwardly inclined, complementary dipole elements forming an obtuse angle between them, said rear member being composed of complementary dipole elements all of which are disposed in a substantially common vertical plane, said rear member having its axis in a horizontal plane, the obtuse angle formed by said front member dipole elements having its apex directed toward, and its arms directed away from, said axis.*

*7. An antenna comprising a front member and a rear member, said rear member being horizontally spaced from said front member so as to act as a reflector therefor, said front member being composed of complementary dipole elements all of which are forwardly inclined and forming an obtuse angle between them, said rear member being composed of complementary dipole elements all of which are disposed in a substantially common vertical plane, said rear member having its axis in a horizontal plane, the obtuse angle formed by said front member dipole elements having its apex directed toward, and its arms directed away from, said axis.*

MICHAEL D. ERCOLINO.

REFERENCES CITED

The following references are of record in the file of this patent or the original patent:

UNITED STATES PATENTS

| Number | Name | Date |
|---|---|---|
| 2,064,774 | Wheeler | Dec. 15, 1936 |
| 2,110,159 | London et al. | Mar. 8, 1938 |
| 2,165,958 | Carter | July 11, 1939 |
| 2,224,898 | Carter | Dec. 17, 1940 |
| 2,259,628 | Fener et al. | Oct. 21, 1941 |
| 2,274,149 | Lubcke | Feb. 24, 1942 |
| 2,352,977 | Scheldorf | July 4, 1944 |
| 2,419,552 | Himmel et al. | Apr. 29, 1947 |
| 2,471,215 | Jackson | May 24, 1949 |
| 2,471,256 | Wintermute | May 24, 1949 |
| 2,476,469 | Walker | July 19, 1949 |

FOREIGN PATENTS

| Number | Country | Date |
|---|---|---|
| 469,366 | Great Britain | July 23, 1937 |
| 530,114 | Great Britain | Dec. 5, 1940 |

OTHER REFERENCES

Radio's Master, twelfth ed., United Catalog Publishers, Inc., page 40, May 9, 1947.

Tele-Tech, May 1948, page 85.

Radio News, May 1945, pages 41 and 42.